(12) United States Patent
Johnson et al.

(10) Patent No.: US 7,640,929 B2
(45) Date of Patent: Jan. 5, 2010

(54) BARBECUE GRILL COOKING CHAMBER WITH GREASE CONTROL STRUCTURES

(75) Inventors: Mark Johnson, Cary, IL (US); Adrian A. Bruno, Rolling Meadows, IL (US); Mohammed Shoeb, Hoffman Estates, IL (US)

(73) Assignee: Weber-Stephen Products Co., Palatine, IL (US)

(*) Notice: Subject to any disclaimer, the term of this patent is extended or adjusted under 35 U.S.C. 154(b) by 21 days.

(21) Appl. No.: 10/319,434

(22) Filed: Dec. 13, 2002

(65) Prior Publication Data

US 2004/0112365 A1 Jun. 17, 2004

(51) Int. Cl.
*A47J 37/00* (2006.01)
(52) U.S. Cl. ...................................... 126/41 R; 126/50
(58) Field of Classification Search ............... 126/41 R, 126/25 R, 38, 9 R, 39 B, 40, 50, 304 R, 305; 99/446, 444, 450
See application file for complete search history.

(56) References Cited

U.S. PATENT DOCUMENTS

| | | | | |
|---|---|---|---|---|
| 852,677 | A | * | 5/1907 | Reaser .................... 126/384.1 |
| 923,348 | A | | 6/1909 | Fey |
| 1,118,501 | A | | 11/1914 | Laughlin |
| 1,133,850 | A | | 3/1915 | Garraux |
| 1,330,209 | A | * | 2/1920 | Massing ...................... 99/347 |
| 1,375,028 | A | * | 4/1921 | Tollagsen ................... 126/369 |
| 1,437,812 | A | * | 12/1922 | MacMillan .................. 126/38 |
| 1,504,102 | A | | 8/1924 | Davis |
| 1,548,185 | A | | 8/1925 | Carr |
| 1,554,612 | A | * | 9/1925 | Wilson et al. ................. 99/279 |
| 1,954,476 | A | | 4/1934 | Gloekler |
| 1,998,944 | A | | 4/1935 | Spake |
| 2,025,333 | A | * | 12/1935 | Richheimer .............. 126/377.1 |
| 2,097,793 | A | | 11/1937 | Howell |
| 2,122,275 | A | | 6/1938 | Bitney |
| 2,186,845 | A | * | 1/1940 | Stiles ......................... 219/438 |
| 2,211,545 | A | | 8/1940 | Osborne |
| 2,403,134 | A | | 7/1946 | Stephenson |
| 2,641,243 | A | * | 6/1953 | Goss ........................ 126/25 R |
| 2,722,883 | A | | 11/1955 | Rignell |

(Continued)

FOREIGN PATENT DOCUMENTS

DE          37 31 352        *    4/1989

(Continued)

*Primary Examiner*—Carl D Price
(74) *Attorney, Agent, or Firm*—Baker & McKenzie LLP; David I. Roche; Daniel A. Tallitsch (57) ABSTRACT

The present invention provides a barbecue grill assembly comprising a cooking chamber with a cover and a firebox. The cover is moveable between an open position and a closed position. The cover has an inner surface and an internal lip extending from a lower edge region of the inner surface. The firebox has a rim at an upper portion of the firebox wherein the rim defines a periphery of the firebox. When the cover is in the closed position, the internal lip is positioned inward of the firebox periphery. This means that the internal lip is positioned within the perimeter of the firebox, as defined by the rim. The grill assembly further comprises a burner element positioned in the firebox, a cooking grate positioned in the firebox above the burner element, and a frame assembly adapted to support the cooking chamber.

5 Claims, 5 Drawing Sheets

U.S. PATENT DOCUMENTS

| | | | |
|---|---|---|---|
| 2,723,658 A | 11/1955 | Schmieding | |
| 2,791,959 A | 5/1957 | Pirz | |
| 2,842,044 A | 7/1958 | Kirk | |
| 2,867,352 A * | 1/1959 | Kawano | 220/366.1 |
| 2,881,695 A | 4/1959 | Pietro | |
| 2,905,077 A | 9/1959 | Francia | |
| 2,925,028 A * | 2/1960 | Haynes et al. | 99/446 |
| 2,940,381 A | 6/1960 | Cottongim et al. | |
| 2,997,941 A * | 8/1961 | Phelan et al. | 99/332 |
| 3,028,039 A * | 4/1962 | Clark | 220/366.1 |
| 3,040,651 A | 6/1962 | Nolte, Jr. | |
| 3,095,869 A | 7/1963 | Swenson | |
| 3,121,424 A | 2/1964 | Russell | |
| 3,330,204 A | 7/1967 | Little | |
| 3,369,481 A | 2/1968 | Pappas | |
| 3,391,682 A | 7/1968 | King et al. | |
| 3,459,171 A | 8/1969 | Swanson | |
| 3,500,812 A * | 3/1970 | Korngold | 126/25 R |
| 3,528,401 A * | 9/1970 | Moore | 126/369 |
| 3,552,301 A | 1/1971 | McNeff | |
| 3,683,791 A * | 8/1972 | Rast, Jr. | 99/340 |
| 3,688,758 A | 9/1972 | Stephen, Jr. | |
| 3,771,510 A | 11/1973 | Short | |
| 3,780,642 A * | 12/1973 | Bay | 99/347 |
| RE27,920 E * | 2/1974 | Cole | 99/323.8 |
| 3,800,777 A | 4/1974 | Gebien | |
| 3,870,031 A | 3/1975 | Krüper | |
| 3,938,494 A | 2/1976 | Clark | |
| 4,092,295 A * | 5/1978 | Takamori et al. | 525/438 |
| 4,106,486 A * | 8/1978 | Lee | 126/369 |
| 4,165,683 A * | 8/1979 | Van Gilst | 99/393 |
| 4,201,125 A | 5/1980 | Ellis | |
| 4,403,541 A | 9/1983 | Berger | |
| 4,432,334 A | 2/1984 | Holt | |
| 4,462,308 A * | 7/1984 | Wang | 99/413 |
| 4,530,343 A | 7/1985 | Beck | |
| 4,569,279 A | 2/1986 | Avner | |
| 4,604,989 A * | 8/1986 | Kita | 126/369 |
| 4,606,261 A | 8/1986 | Bernardi | |
| RE32,288 E | 11/1986 | Berger | |
| 4,630,593 A | 12/1986 | Gremillion | |
| 4,662,349 A | 5/1987 | McKenzie et al. | |
| 4,677,964 A | 7/1987 | Lohmeyer et al. | |
| 4,700,689 A * | 10/1987 | Speker | 126/381.1 |
| 4,703,746 A | 11/1987 | Hitch | |
| RE32,754 E | 9/1988 | Hahn | |
| 4,773,319 A | 9/1988 | Holland | |
| 4,809,671 A | 3/1989 | Vallejo, Jr. | |
| 4,829,975 A | 5/1989 | Hait | |
| 4,850,333 A | 7/1989 | Dellrud et al. | |
| 4,896,650 A | 1/1990 | Hait | |
| 4,917,262 A * | 4/1990 | Mita | 220/360 |
| 4,930,491 A | 6/1990 | Purello | |
| 4,969,449 A | 11/1990 | Levin | |
| 4,976,252 A | 12/1990 | Cianciola | |
| 4,979,440 A | 12/1990 | Latour et al. | |
| 5,009,151 A | 4/1991 | Hungerford | |
| 5,044,266 A | 9/1991 | Geogaris | |
| 5,070,857 A * | 12/1991 | Sarten | 126/25 R |
| 5,076,155 A | 12/1991 | Golob | |
| 5,163,359 A * | 11/1992 | McLane, Sr. | 99/447 |
| 5,179,932 A | 1/1993 | DeCarlo | |
| 5,272,317 A | 12/1993 | Ryu | |
| 5,293,859 A | 3/1994 | Lisker | |
| 5,299,931 A | 4/1994 | Lee | |
| D346,531 S | 5/1994 | Stephen et al. | |
| 5,313,877 A * | 5/1994 | Holland | 99/446 |
| 5,331,942 A | 7/1994 | McDonald et al. | |
| 5,345,923 A | 9/1994 | Luebke et al. | |
| 5,359,988 A | 11/1994 | Hait | |
| 5,365,833 A * | 11/1994 | Chen | 99/447 |
| D363,640 S | 10/1995 | King et al. | |
| 5,490,452 A | 2/1996 | Schlosser et al. | |
| 5,511,466 A * | 4/1996 | Dzibinski | 99/339 |
| 5,529,798 A | 6/1996 | Clark et al. | |
| 5,566,606 A * | 10/1996 | Johnston | 99/446 |
| 5,582,094 A * | 12/1996 | Peterson et al. | 99/445 |
| 5,588,420 A * | 12/1996 | Dickson | 126/25 R |
| 5,603,256 A | 2/1997 | Charlson et al. | |
| 5,617,778 A | 4/1997 | Schroeter et al. | |
| 5,638,808 A | 6/1997 | Home | |
| 5,755,154 A | 5/1998 | Schroeter et al. | |
| 6,196,120 B1 * | 3/2001 | Reames | 99/413 |
| 6,257,130 B1 | 7/2001 | Schlosser | |
| 6,260,478 B1 | 7/2001 | Harneit | |
| 6,343,545 B1 * | 2/2002 | Patterson et al. | 99/423 |
| 6,349,713 B1 | 2/2002 | Toyama | |
| 6,349,717 B1 | 2/2002 | Thompson et al. | |
| 6,481,343 B1 | 11/2002 | Rigney et al. | |
| 6,606,987 B2 * | 8/2003 | DeMars | 126/38 |
| 6,615,707 B1 * | 9/2003 | Zittel et al. | 99/348 |
| 6,941,941 B1 * | 9/2005 | Hall | 126/25 R |
| 6,981,497 B2 * | 1/2006 | DeMars | 126/38 |

FOREIGN PATENT DOCUMENTS

| | | | |
|---|---|---|---|
| FR | 2 643 805 | * | 9/1990 |
| GB | 2 181 634 | * | 4/1987 |
| JP | 08-200939 | * | 8/1996 |

* cited by examiner

FIG. 1

BARBECUE GRILL COOKING CHAMBER WITH GREASE CONTROL STRUCTURES

CROSS-REFERENCE TO RELATED APPLICATIONS

Not applicable.

FEDERALLY SPONSORED RESEARCH OR DEVELOPMENT

Not applicable.

TECHNICAL FIELD

The present invention relates to the cooking chamber of a barbecue grill. More specifically, the present invention relates to the cooking chamber of a barbecue grill having at least one structure to contain grease and byproducts generated during the cooking process within the cooking chamber.

BACKGROUND OF THE INVENTION

Although barbecue grills have grown tremendously popular, there are two primary types of barbecue grills: gas grills and solid fuel grills. Gas barbecue grills employ a burner or group of burners to cook food that is supported on a grate above the burner(s). The fuel source for gas barbecue grills is typically liquid propane or natural gas. Solid fuel barbecue grills use combustible solid fuel, typically charcoal, to cook the food. As a result, this type of grill is commonly referred to as a charcoal barbecue grill. Regardless of the type, the barbecue grill has a cooking chamber that includes a cover and a firebox. The cooking chamber is movable between an open position and a closed position. Preferably, the cooking chamber is in the closed position when the food is being cooked by the barbecue grill.

During operation of the barbecue grill, food is placed on the grate and grease and other byproducts are generated during the cooking process. The quantity of grease and byproducts generated during the cooking process varies with a number of factors, including but not limited to the type of food cooked on the grate, the amount of food cooked, the amount of heat generated by the burner tube, and the ambient conditions. In addition, certain types of foods produce a larger amount of grease and byproducts than other types. Over time and repeated use, grease and byproducts can accumulate within the cooking chamber. The accumulation of grease and byproducts can negatively affect the performance and operation of the barbecue grill assembly.

An example of a gas barbecue grill is shown in U.S. Pat. No. 4,677,964 to Lohmeyer et al. In FIG. 4, the cooking chamber 52 comprises the cover 58 and the firebox 56. A burner element 62 is positioned in a lower region of the firebox 56 and a grate 66 is positioned in an upper region of the firebox 56. A drip pan 98 collects grease and byproducts that pass through the drain opening in the lower portion of the firebox 56. The cover 58 is movably supported by a hinge 60 positioned at the rear of the cooking chamber 52. A rim defines a perimeter of the of the firebox 56. In the closed position of FIG. 4, the rim engages the angled front wall of the cover 58.

A charcoal barbecue grill is disclosed in U.S. Pat. No. 3,688,758 to Stephen. In FIG. 2, the cooking chamber 20 comprises the cover 28 and the firebox 26. A lower grate 46 supports the combustible fuel in a position below the cooking grate 44. A rim having a rolled lip defines a perimeter of the firebox 26. When the cover 28 is in the open position, hooks 62 engage an inner surface of the firebox 26 below the rim. When the cover 28 is in the closed position, the rim of the cover 28 engages the rim of the firebox 26.

Over time and repeated use, grease and byproducts can accumulate within the cooking chamber. The accumulation of grease and byproducts can negatively affect the performance and operation of the barbecue grill assembly. Conventional cooking chambers are prone to the build-up of grease and byproducts within the cooking chamber. This means that grease and byproducts can accumulate on the inner surface of the cover and at the interface region where the cover meets the rim of the firebox. This condition is exacerbated with compact grill assemblies since within the cooking chamber, the grate is positioned relatively close to the inner surface of the cover. As a result, a greater amount of grease and byproducts come into contact with the inner surface of the cover during the cooking process. Accordingly, conventional cooking chambers permit the accumulation of grease and byproducts which negatively affects the performance and operation of the barbecue grill.

Therefore, there is a definite need for a cooking chamber that reduces the accumulation of grease and byproducts near the interface region. In addition, there is a measurable need for a cooking chamber that directs and controls the flow of grease and byproducts from the interface region towards a lower portion of the firebox to ensure the long-term performance and operation of the barbecue grill. The present invention is provided to solve these and other problems.

SUMMARY OF THE INVENTION

The present invention relates to a cooking chamber of a compact barbecue grill assembly. The cooking chamber is supported by a frame assembly and includes a cover connected to a firebox. A grate is removably positioned generally within the firebox. The barbecue grill assembly further includes a first work surface and a second work surface, each pivotally connected to a portion of the frame assembly.

The cover has a geometry defined by a top wall joined to a wall arrangement preferably having a first side wall, a second side wall, a front wall, and a rear wall. A handle adapted to allow a user to lift the cover extends from the front wall. The cover has at least one grease control structure adapted to reduce the accumulation of grease and byproducts at the interface region where the cover meets the firebox. The grease control structure comprises an internal lip depending from an inner surface of the cover. The internal lip can depend from the front wall and/or the back wall. Alternatively, internal lips can depend from a combination of the front and rear walls and the first and second wide walls. In the event that the cooking chamber has a domed or rounded configuration without a definite front or back wall, the internal lip depends from the inner surface of the cover. The cover further includes a front ledge and a rear ledge, wherein the front ledge extends along the front wall and the rear wall extends along the rear wall. The front ledge has a generally horizontal wall and a generally vertical wall. The internal lip together with the horizontal wall and the vertical wall define a front cavity. The rear ledge has a generally horizontal wall and a generally vertical wall. The internal lip together with the horizontal wall and the vertical wall define a rear cavity. A first hood extends from the first side wall and a second hood extends from the second side wall. The first hood comprises a generally horizontal wall, a first hood lip, and a second hood lip. The first and second hood lips and the horizontal wall define a first channel. Similarly, the second hood comprises a generally horizontal wall, a first hood lip, and a second hood lip. The first and second hood lips and the horizontal wall define a second channel.

In accord with the invention, the firebox has a geometry defined by a bottom wall joined to a wall arrangement preferably having a first side wall, a second side wall, a front wall, and a rear wall. A plurality of support members are positioned along the interior of an upper portion of the firebox. The support members are adapted to support the grate in a generally horizontal position below a rim of the firebox. The rim defines a periphery or a perimeter of the firebox. The rim has a front portion generally corresponding to the front wall of the firebox, a rear portion corresponding to the rear wall, a first side portion corresponding to the first side wall, and a second side portion corresponding to the second side wall. A burner element is positioned generally within a lower portion of the firebox below the grate. The burner has a geometry or configuration similar to the interior geometry of the firebox and is spaced a distance from the inner surfaces of the firebox. The burner has a plurality of outlet ports or apertures from which a flame extends thereby defining a burner flame region. A fuel source provides combustible fuel to the burner element and is supported by a ring extending from the support frame. A drain opening is positioned in the bottom wall of the firebox. A pan is positioned below the drain opening and is adapted to gather the grease and byproducts that exit the cooking chamber through the drain opening.

In accord with the invention, the cooking chamber is movable between an open position and a closed position. In the closed position, the internal lip of the cover is positioned inward of the rim of the firebox. When the cooking chamber is in the closed position, the internal lip of the cover is positioned within the periphery or perimeter of the firebox. In the closed position, a portion of the vertical wall of the front ledge is positioned beyond the perimeter of the firebox. Similarly, In the horizontal wall of the front ledge is positioned generally over the rim of the firebox. In the closed position, various portions of the first and second hoods are positioned within, above, and beyond the rim of the firebox. In the closed position, the first and second hoods form a passageway between the hoods and the rim and the grate. The passageways are regions adapted to vent the cooking chamber to the ambient environment.

While food is cooked on the grate, grease and byproducts spread throughout the cooking chamber, including the inner surfaces of the cover and the firebox. The positioning of the internal lip with respect to the rim and perimeter of the firebox reduces the accumulation of grease and byproducts at the interface region between the cover and the firebox. Furthermore, the internal lip directs the flow of grease and byproducts towards a lower portion of the firebox and the drain opening. Accordingly, the performance and long-term operation of the barbecue grill assembly is increased.

Other features and advantages of the invention will be apparent from the following specification taken in conjunction with the following drawings.

DETAILED DESCRIPTION OF THE INVENTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
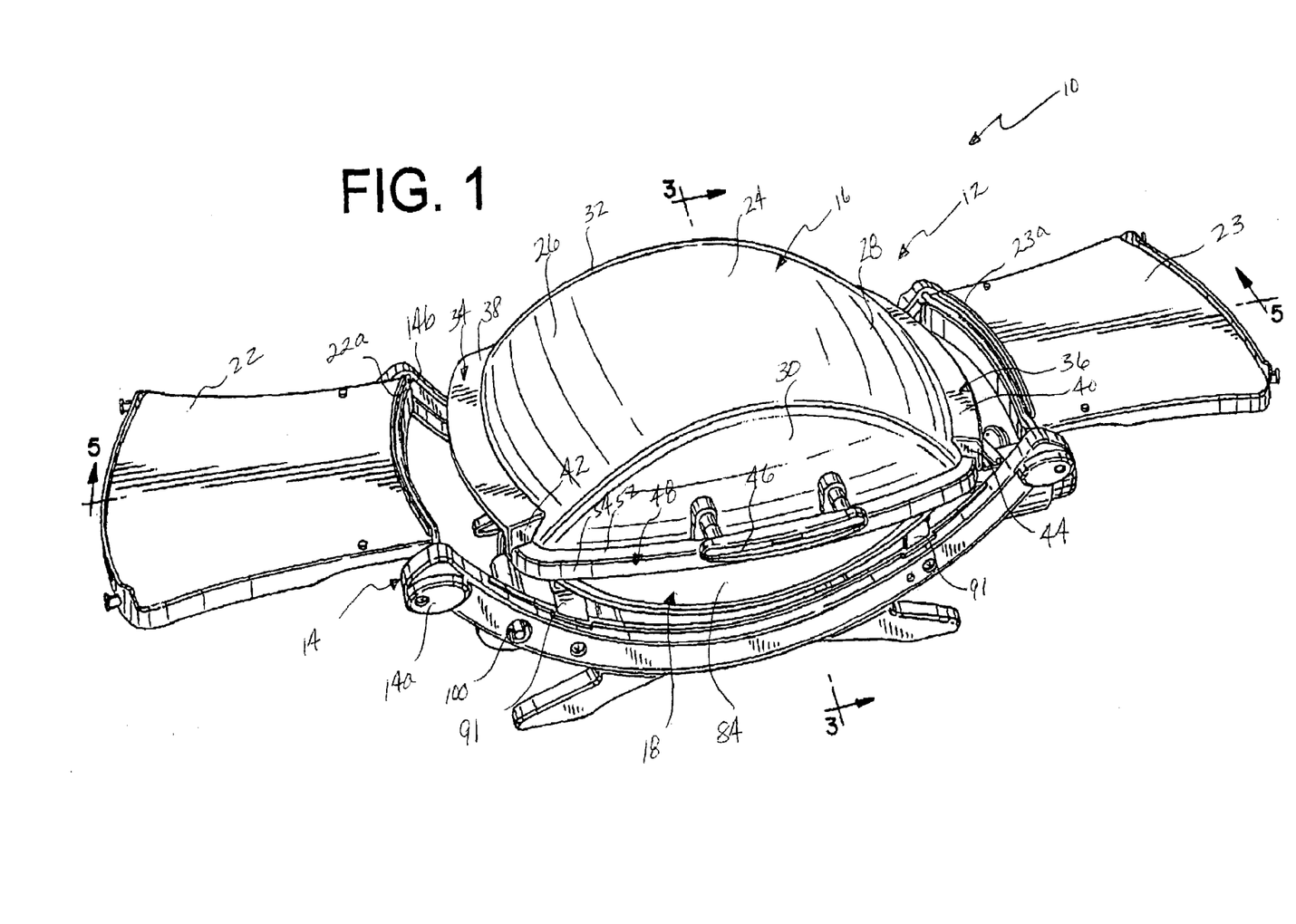
FIG. 1 is a perspective view of a barbecue grill assembly showing a cooking chamber of the invention in a closed position.

A barbecue grill assembly 10 is shown in FIG. 1. The barbecue grill assembly 10 generally includes a cooking chamber 12 and a support frame assembly 14. The support frame assembly 14 is adapted to provide support to the cooking chamber 12 and has a front structure 14a and a rear structure 14b. The cooking chamber 12 includes a cover 16 connected to a firebox 18 by a pair of hinges 17. The firebox 18 is connected to the support frame assembly 14 by a plurality of brackets 19. A grate 20 is removably positioned generally within the firebox 18. The grate 20 defines a cooking surface upon which food is placed during operation of the grill assembly 10. The barbecue grill assembly 10 further includes a first work surface 22 and a second work surface 23, each pivotally connected to a portion of the support frame assembly 14. The first and second work surfaces 22, 23 have a generally vertical wall 22a, 23a. The barbecue grill assembly 10 has a compact configuration meaning that its overall height is less than that of conventional upright barbecue grills. As a result, the barbecue grill assembly 10 is capable of operation while positioned on a table top. Furthermore, the barbecue grill assembly 10 is sized such that it can be lifted by a single user and carried between locations for use.

Figure 2:
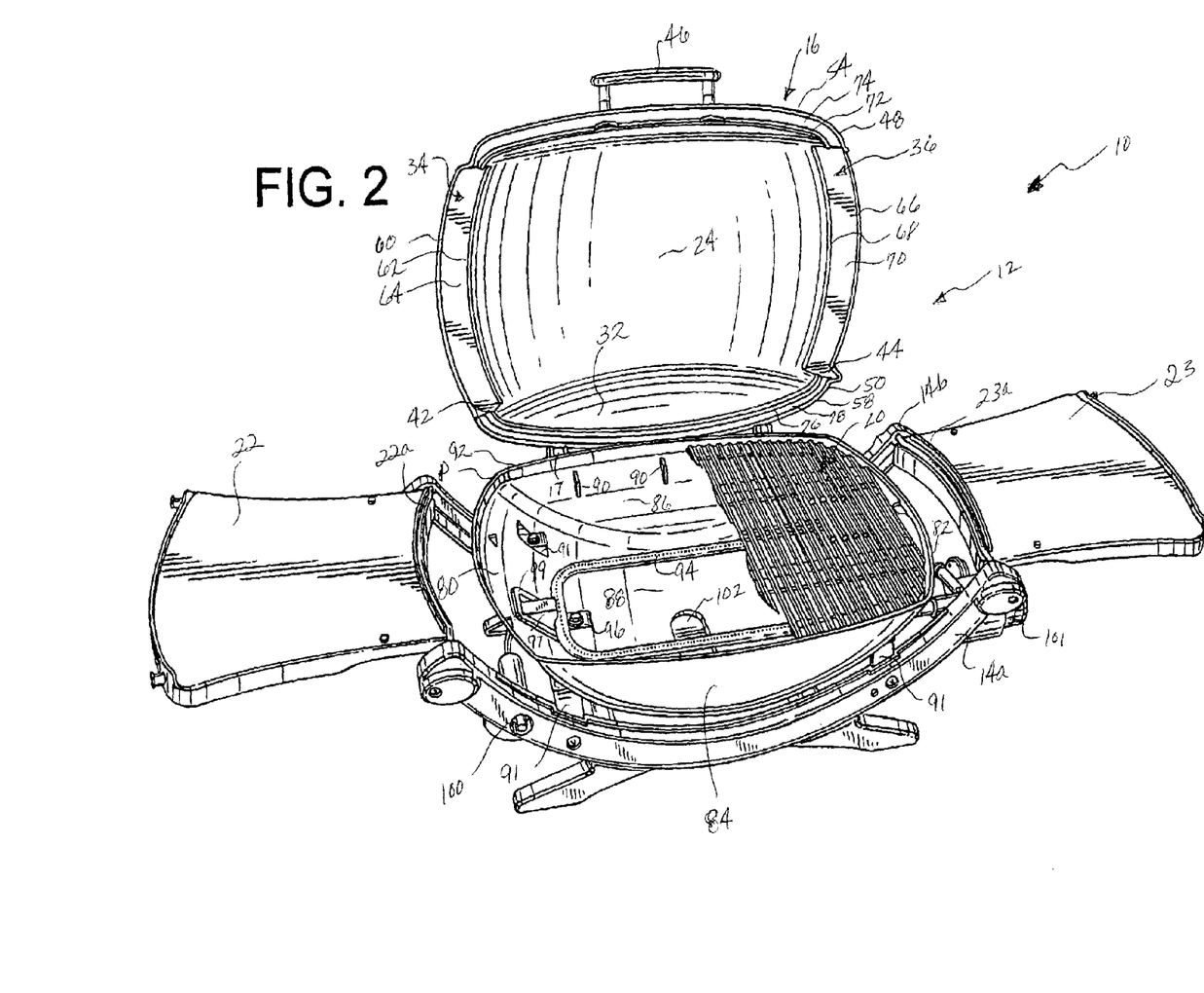
FIG. 2 is a perspective view of the grill assembly of FIG. 1 showing the cooking chamber in an open position.

The cover 16 has a geometry defined by a top wall 24 jointed to a generally vertical wall arrangement—preferably having a first side wall 26, a second side wall 28, a front wall 30, and a rear wall 32. Although the cover 16 is shown as having a curvilinear configuration with curved or sloped walls 24, 26, 28, 30, 32, the cover 16 can have a generally linear configuration. The cover 16 has at least one grease control structure adapted to reduce the accumulation of grease and byproducts at the interface region, which is the region where the cover 16 meets the firebox 18. The grease control structure comprises an internal lip 33 extending from a lower region of an inner surface 16a of the cover 16. As shown in FIG. 2, the internal lip 33 depends from the front wall 30 and the rear wall 32 of the cover 16. Alternatively, the internal lip 33 depends from the front wall 30 or the rear wall 32 Alternatively, the internal lip 33 can depend from a combination of the front and rear walls 30, 32 and the side walls 26, 28. In the event that the cooking chamber 12 has a dome-like or rounded configuration without a definite front or back wall, the internal lip 33 depends from the inner surface of the cover 16.

A first hood 34 extends transversely from a portion of the first side wall 26 and a second hood 36 extends transversely from a portion of the second side wall 28. The first and second hoods 34, 36 have a generally horizontal wall 38, 40 and a pair of generally vertical walls 42, 44. A handle 46 adapted to allow a user to lift the cover 16 extends from the front wall 30. Referring to FIG. 2, the cooking chamber 12 is shown in an open position. In the open position, the cover 16 exposes the interior and inner surfaces of the firebox 18 and the grate 20. The first hood 34 has a first hood lip 60 and a second hood lip 62 that define a first channel 64. Similarly, the second hood 36 has a first hood lip 66 and a second hood lip 68 that define a second channel 70. The first hood lips 60, 66 depend or extend in a generally downward direction from an outer edge of the hood 34, 36. The second hood lips 62, 68 depend or extend in a generally downward direction from an inner edge of the hood 34, 36 where the hood 34, 36 meets the side walls 26, 28. Thus, the second hood lips 62, 68 are positioned within the interior of the cover 16. The degree or amount that the first and second lips 60, 62, 66, 68 extend downward varies with the design parameters of the cooking chamber 12. Also, the first and second lips 60, 62, 66, 68 may extend downward substantially perpendicular to, or angled from the hood 34, 36.

Figure 3:
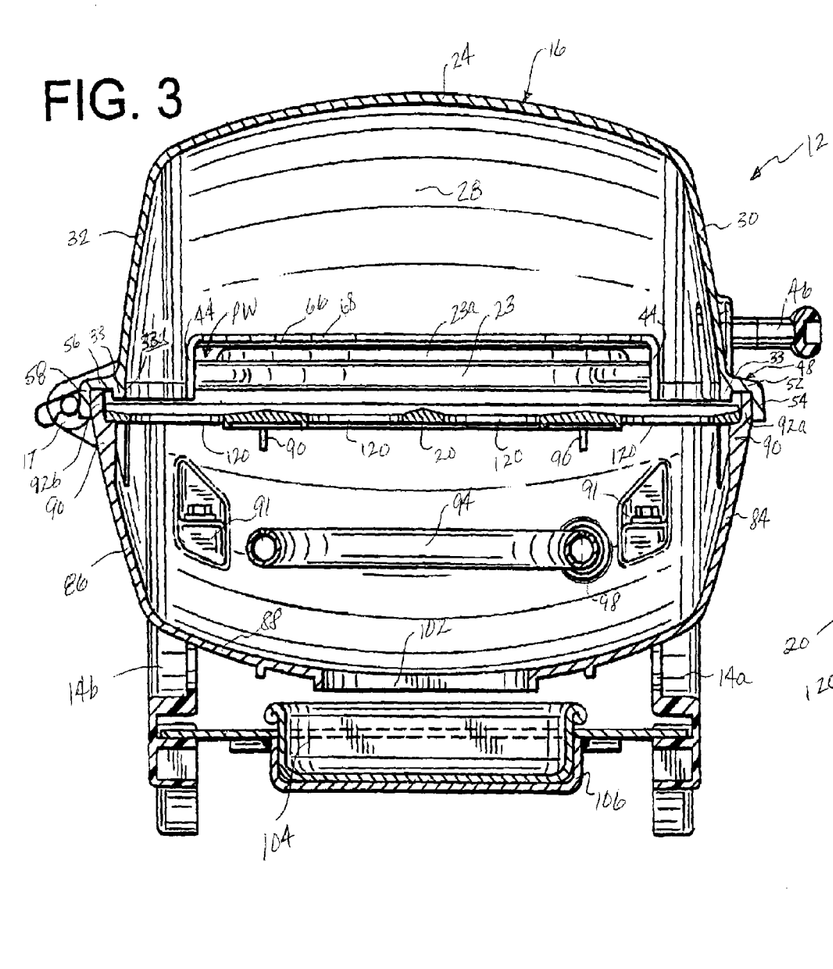
FIG. 3 is a sectional view of the grill assembly of FIG. 1 taken along line 3-3 of FIG. 1 showing the cooking chamber in a closed position.
Figure 4:
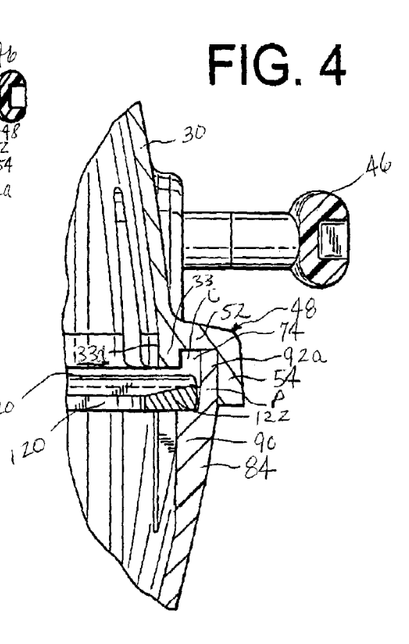
FIG. 4 is a detail view of the grill assembly of FIG. 1 showing the cooking chamber in a closed position.

The cover 16 has a front ledge 48 and a rear ledge 50 (see FIGS. 3 and 4). The front ledge 48 extends along the front wall 30 of the cover 16 and substantially between the first and second hoods 34, 36. Similarly, the rear ledge 50 extends along the rear wall 32 and substantially between the first and second hoods 34, 36. The front ledge 48 has a generally horizontal wall 52 and a generally vertical wall 54. The rear ledge 50 has a generally horizontal wall 56 and a generally vertical wall 58. Referring to FIGS. 3 and 4, the front and rear ledges 48, 50 have an inverted L-shaped configuration The internal lip 33 is positioned along an extent of the front ledge 48 at the junction of the ledge 48 and the front wall 30. The internal lip 33 can be continuous or segmented. The internal lip 33 has an internal surface 33d (see FIG. 4) that defines a plane that is substantially perpendicular to a cooking surface of the grate 20. The internal lip 33, the horizontal wall 52, and the vertical wall 54 define a front cavity or receiver 74. The internal lip 33 positioned near the front wall 30 has depressions to accommodate the fasteners used to secure the handle 46 to the cover 16. An internal lip 33 is positioned along an extent of the rear ledge 50 at the junction of the ledge 50 and the rear wall 32. The internal lip 33 can be continuous or segmented. The internal lip 33 has an internal surface 33d that defines a plane that is substantially perpendicular to a cooking surface of the grate 20. The internal lip 33, the horizontal wall 56, and the vertical wall 58 define a rear cavity or receiver 78. Each of the channels 64, 70 and the cavities 74, 78 have a length L, width W, and depth D. The dimensions and configurations of the channels 64, 70 and the cavities 74, 78 vary with the design parameters of the cooking chamber 12. In addition, the internal lip 33 has a length L, width W, and depth D. The internal lip 33 defines an interior perimeter $P_I$ of the cover 16. Whereas, the first hood lips 60, 66 and the vertical walls 54, 58 define an exterior perimeter $P_E$ of the cover 16.

The firebox 18 has a geometry defined by a bottom wall 88 joined to a generally vertical wall arrangement—preferably having a first side wall 80, a second side wall 82, a front wall 84, and a rear wall 86. Preferably, the firebox 18 has a configuration similar to that of the cover 16. As shown, the firebox 18 has a curvilinear configuration with curved or sloped walls 80, 82, 84, 86, 88. A plurality of support members 90 are positioned along the interior of an upper portion of the firebox 18. The support members 90 are adapted to support the grate 20 in a generally horizontal position below a rim 92 of the firebox 18. In general terms, the rim 92 represents the periphery or upper edge of the firebox 18. The rim 92 defines a perimeter P of the firebox 18. The rim 92 has a front portion 92a generally corresponding to the front wall 84 of the firebox 18, a rear portion 92b corresponding to the rear wall 86, a first side portion 92c corresponding to the first side wall 80, and a second side portion 92 corresponding to the second side wall 82. Alternatively, the support members 90 are omitted and the firebox 18 has a ledge to support the grate 20. A plurality of brackets 91 connect the firebox 18 to the support frame 14, A burner element 94 is positioned generally within a lower portion of the firebox 18 of the cooking chamber 12. In other words, the burner 94 is positioned below the grate 20. As shown in the figures, the burner 94 is a burner tube or loop, however, a conventional ring or H-shaped burner can be employed in the barbecue grill assembly 10. A portion of the burner 94 is supported within the firebox 18 by a block 96 extending from the first side wall 80. The burner 94 has a plurality of linear, curvilinear, and transition segments resulting in a continuous configuration. The burner 94 has a geometry or configuration similar to the interior geometry of the firebox 18 such that the burner 94 is capable of being received by the firebox 18. Preferably, the burner 94 is a cylindrical element with a circular cross-section with an inner wall diameter and an outer wall diameter. An inlet portion of the burner 94 extends through an opening 98 (see FIG. 3) of the second side wall 82 and is connected to a fuel source (not shown) to define a pathway for flow of the fuel. The burner 94 has a plurality of outlet ports or apertures from which a flame extends thereby defining a burner flame region. An ignitor assembly 97 extends into the firebox 18 through the first side wall 80. A shrouding 99 extends from an interior surface 80a of the first side wall 80 and is positioned about the ignitor assembly 97. The shrouding 99 is adapted to prevent the accumulation of grease and byproducts on the ignitor assembly 97. As shown in FIG. 2, the shrouding 99 has a top wall component with a linear configuration, however, the top wall component can have an angled, peaked, or curvilinear configuration. An ignitor button 100 extends from the front structure 14a of the support assembly 14 and is used to ignite fuel that flows through the burner 94. A fuel source (not shown) provides combustible fuel to the burner element 94 and is supported by a ring 95 (see FIG. 5) extending from the support frame 14b. The fuel source is connected to a regulator and inlet valve assembly 101.

A drain opening 102 is positioned in the bottom wall 52 of the firebox 18. The drain opening 102 is adapted to drain grease and other byproducts that are generated by cooking food on the grate 20. Described in a different manner, the drain opening 102 functions as a passageway for the removal or drainage of grease and byproducts from the cooking chamber 12. A pan 104 is positioned below the drain opening 102 and is adapted to gather the grease and byproducts that exit the cooking chamber 12. A pan support 106 is adapted to support the pan 104 in a generally horizontal position below the cooking chamber 12. The pan support 106 is positioned between the front and rear portions 14a, 14b of the support frame 14.

Figure 5:
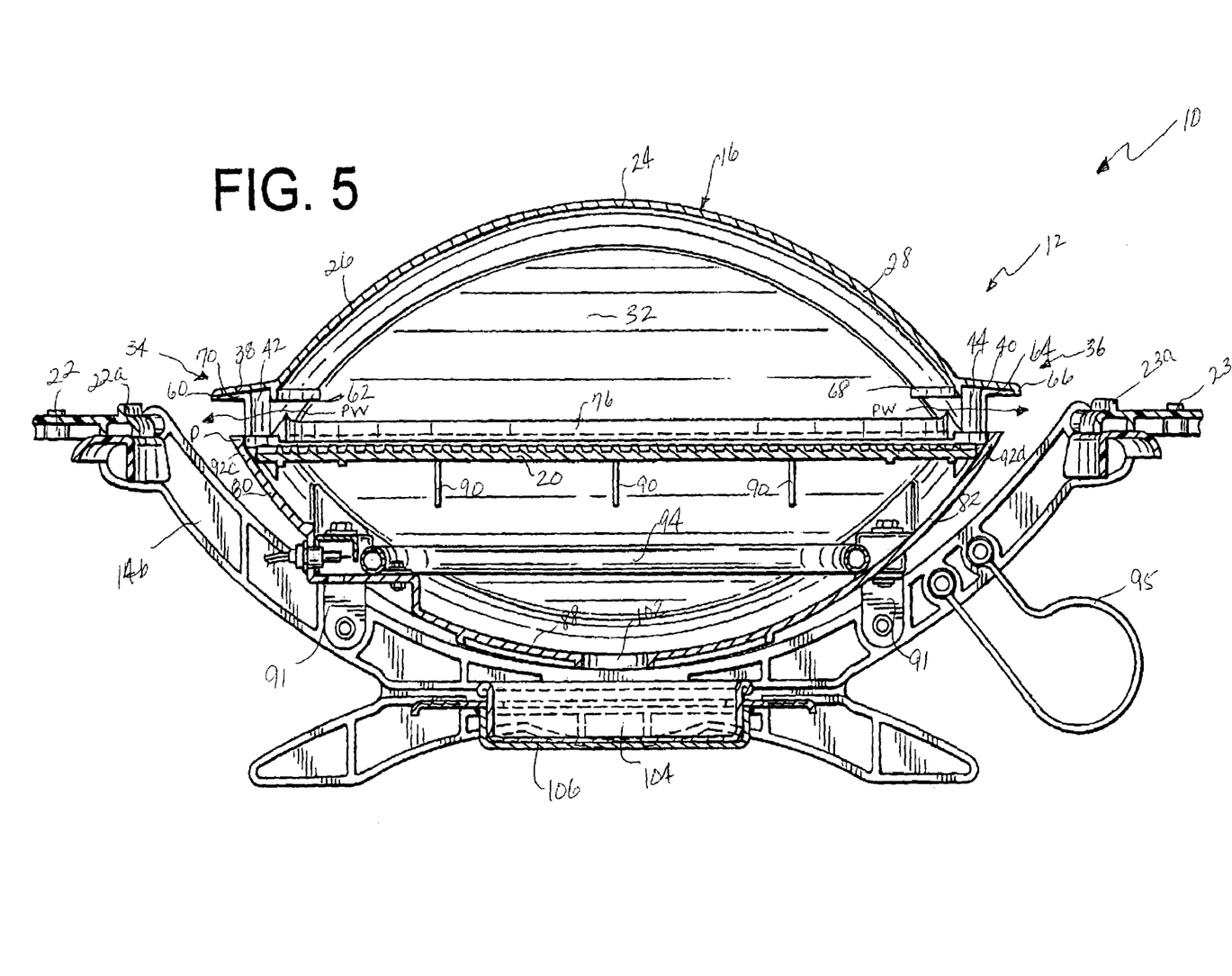
FIG. 5 is a sectional view of the grill assembly of FIG. 1 taken along line 4-4 of FIG. 1 showing the cooking chamber in a closed position; and, FIG. 6 is a sectional view of the grill assembly of FIG. 1 showing the cooking chamber in an intermediate position.

In FIGS. 3-5, the cooking chamber 12 is shown in a closed position. In the closed position, the internal lip 33 is positioned within the perimeter P of the firebox 18 (where the perimeter P is defined by the rim 92 of the firebox 18). Described in a different manner, the internal lip 33 is positioned inward of the rim 92 of the firebox 18. Described in yet another manner, the internal lip 33 is positioned inward of the periphery of the firebox 18. In the closed position, the inner lip 33 is positioned above a front ridge 122 of the grate 20. Also, the inner lip 33 is positioned above a rear ridge 124 of the grate 20. When the cooking chamber 12 is in the closed position, a portion of the vertical wall 54 of the front ledge 48 is positioned beyond the perimeter P. Also, a portion of the vertical wall 58 of the rear ledge 50 is positioned beyond the perimeter P. In the closed position, a portion of the horizontal wall 52 of the front ledge 48 is positioned generally over the perimeter P. In the closed position, a portion of the horizontal wall 56 of the rear ledge 50 is positioned generally over the perimeter P.

In the closed position, the cover 16 receives a portion of the firebox 18. Focusing on the front portion of the cooking chamber 12, the front cavity 74 receives the front portion 92a of the rim 92 of the firebox 18. An outer surface of the front rim portion 92a engages an inner surface of the vertical wall 54. A top surface of the front rim portion 92a engages an inner surface of the horizontal wall 52. Since the width of the cavity 74 is greater than a width of the rim 92, the top surface of the rime portion 92a engages only a portion of the inner surface of the horizontal wall 52a and as a result, a clearance C exists there between. An inner surface of the front rim portion 92a is spaced a distance from the inner lip 33. Alternatively, the rim 92 and the cavity 74 are configured such that the clearance C is not present. In yet another alternative, the inner surface of the rim 92 contacts the internal lip 33 and not the vertical wall 54. The cavity 78 of the rear ledge 50 receives a rear portion of the rim 92 in a manner similar to that of the front cavity 74. Accordingly, the cavities 74, 78 are cooperatively dimensioned with the front and rear portions 92a, 92b of the rim 92. The cavities 74, 78 are cooperatively positioned with the front and rear portions of the rim 92 such that they engage when then the cooking chamber 12 is in the closed position. As explained above, the grate 20 is supported by the support members 90 of the firebox 18 in a generally horizontal position below the rim 92. Preferably, the grate 20 is positioned below the cavities 74, 78 whereby the grate 20 does not interfere with the engagement between the rim 92 and the cavities 74, 78.

In the closed position, various portions of the first and second hoods 34, 36 are positioned within, above, and beyond the rim 92 of the firebox 18. Referring to FIG. 4, the second hood lip 62 of the first hood 34 and the second hood lip 68 of the second hood 36 are positioned within the perimeter P. A portion of the channel 64 and a portion of the horizontal wall 28 of the hood 34 is positioned generally over the first side portion 92c. A portion of the channel 70 and a portion of the horizontal wall 40 of the hood 36 is positioned generally over the second side portions 92d. The first hood lips 60, 66 are positioned beyond the perimeter P defined by the rim 92. This means that the first hood lip 60 is positioned outward of the first side portion 92c and the first hood lip 66 is positioned outward of the second side portion 92d. In the closed position, the first and second hoods 34, 36 form a passageway PW between the hoods 36,38 and the rim 92 and the grate 20. The passageways PW are regions adapted to vent the cooking chamber 12 to the ambient environment. Therefore, smoke and vapors generated during the cooking of food are vented from the cooking chamber 12 through the passageways PW. As shown in FIG. 3, the vertical walls 42, 44 of the first and second hoods 34, 36 are generally aligned with openings 120 in the grate 20. Alternatively, the first and second hoods 34, 36 are configured such that the passageways PW are omitted and the second hood lips 62, 68 are replaced by internal lips 33. Therein, the internal lips 33 of the first and second hoods 34, 36 are positioned within the perimeter P when the cooking chamber 12 is in the closed position.

Figure 6:
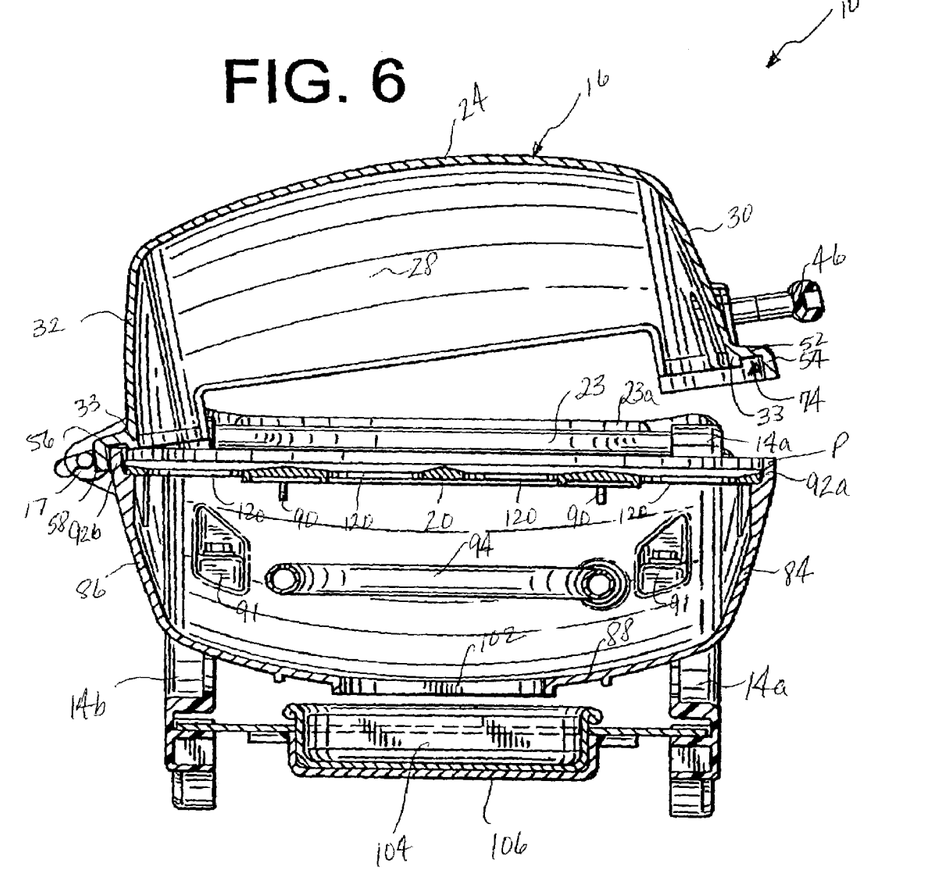

Referring to FIG. 6, the cooking chamber 12 is shown in an intermediate position. wherein the cooking chamber 12 is partially open. In the intermediate position, the front ledge 48 is disengaged from a front portion 92a of the rim 92, meaning that the front portion 92a is not received by the cavity 74. However, the rear portion 92b of the rim 92 is partially received by the cavity 78 of the rear ledge 50. The degree or amount that the rear portion 92b is received by the cavity 78 will vary as the cover 16 is moved between the open position and the closed position. In the intermediate position, the vertical wall 58 is positioned outward of the rear portion 92b while the inner lip 33 is positioned inward of the rear portion 92b. However, as the cover 16 is moved between the open and closed positions, the positioning of the inner lip 33 with respect to the rear portion 92b of the rim 92 varies.

The internal lip 33 and the rim 92 comprise a grease control assembly adapted to reduce the accumulation of grease and byproducts on the inner surface of the cover 16. The grease control assembly is further adapted to direct and control the flow of grease generated by cooking food on the grate 20. The grease control assembly accomplishes this by directing the movement of grease and byproducts from the interface region between the cover 16 and the firebox 18 to a lower portion of the firebox 18.

During operation of the barbecue grill assembly 10, food is placed on the grate 20 and grease and other byproducts are generated during the cooking process. The quantity of grease and byproducts generated during the cooking process varies with a number of factors, including but not limited to the amount of food cooked on the grate 20, the amount of food cooked, the amount of heat generated by the burner element 94, and the ambient conditions. In addition, certain types of foods produce a larger amount of grease and byproducts than other types. For example, cooking a steak or hamburger generally more grease and byproducts than an ear of corn or baked potato. Over time and repeated use, grease and byproducts can accumulate and negatively affect the performance and operation of the barbecue grill assembly 10. In addition, it is important to prevent grease and byproducts from escaping the cooking chamber 12 and soiling the operator of the grill assembly 10. Thus, the effective management of grease and byproducts is an important aspect of the barbecue grill assembly 10.

During the cooking process, grease and byproducts spread throughout the cooking chamber 12, including the inner surfaces of the cover 16 and the firebox 18. The positioning of the internal lip 33 within the perimeter P reduces the accumulation of grease and byproducts at the interface region between the cover 16 and the firebox 18. Furthermore, the internal lip 33 directs the flow of grease and byproducts towards a lower portion of the firebox 18 and the drain opening 102. As a result, the performance and long-term operation of the barbecue grill assembly 10 is increased.

The following example illustrates the operation of the grease control assembly. A quantity of grease and byproducts generated by cooking food on the grate 20 comes into contact with the cover 16 at a mid-point of an inner surface of the front wall 30. Due to the effects of gravity and the inclination of the front wall 30, the grease flows along the inner surface of the front wall 30 in a generally downward direction towards firebox 18. Since grease and byproducts are generally fluid when the barbecue grill 10 is in operation, the grease drains in this direction due to the geometry and orientation of the walls 24, 26, 28, 30, 32 of the cover 16. Described in a different manner, the grease flows along the inner surface towards the interface region where the cover 16 meets the firebox 18 (see FIGS. 3 and 4). There, the grease flows along the inner surface of the internal lip 33 towards the grate 20. At the bottom wall of the internal lip 33, the grease loses contact with the internal lip 33 and passes or drops onto the front ridge 122 of the grate 20, which has inclined surface or configuration. Due to the inclined configuration of the ridge 122, the greases flows down the incline and towards the grate opening 120. There, the grease passes through the opening 120 and comes into contact with an inner surface of the front wall 84 of the firebox 18. When grease passes through the opening 120, it generally avoids contact with the burner element 94. Grease flows along the inner surface of the front wall 84 in a generally downward direction towards the bottom wall 88 of the firebox 18. There, the grease flows along an inner surface of the bottom wall 88 and into the drain opening 102.

The cooking chamber 12 of the present invention can be formed by a number of ways, including cast or stamped. The cooking chamber 12 can be formed from a number of materials such as steel, including low or high alloys, or iron. Alternatively, the cooking chamber 12 can be formed from aluminum, or a mixture of aluminum and another metal, such as copper or magnesium.

While the specific embodiments have been illustrated and described, numerous modifications come to mind without significantly departing from the spirit of the invention and the scope of protection is only limited by the scope of the accompanying Claims.

We claim:

1. A cooking chamber of a barbecue grill assembly, the cooking chamber comprising:
    a discontinuous internal lip depending from an internal surface of the cover, the internal lip defining a grease control surface;
    a firebox having a rim, the rim defining a perimeter of the firebox;
    the internal cover lip being positioned inward of the firebox perimeter;
    the cover having a lower edge region that defines a lower periphery of the lid, the cover having a hood that extends from a portion of the lower edge region, the hood being disposed at a higher elevation than a remaining portion of the lower edge region whereby a passageway is formed between the hood and the rim of the firebox to provide a vent for the cooking chamber;
    the internal lip comprising at least a first lip and a second lip, the second lip depending from the hood and the first lip depending from the remaining portion of the lower edge region, whereby the second lip is positioned generally upwardly and inwardly from the first lip;
    the first and second lips at least partially overlapping, whereby the internal lip provides grease control about the entire circumference of the cover;
    wherein a cooking grate is positioned in the cooking chamber, the cooking grate has a perimeter defined at least in part by a ridge, the grate ridge has a sloped configuration and the internal cover lip is positioned directly over the sloped ridge to direct grease generated during operation of the grill assembly from the cover onto the ridge.

2. A cooking chamber of a barbecue grill assembly, the cooking chamber comprising:
    a discontinuous internal lip depending from an internal surface of the cover, the internal lip defining a grease control surface;
    a firebox having a rim, the rim defining a perimeter of the firebox;
    the internal cover lip being positioned inward of the firebox perimeter;
    the cover having a lower edge region that defines a lower periphery of the lid, the cover having a hood that extends from a portion of the lower edge region, the hood being disposed at a higher elevation than a remaining portion of the lower edge region whereby a passageway is formed between the hood and the rim of the firebox to provide a vent for the cooking chamber;
    the internal lip comprising at least a first lip and a second lip, the second lip depending from the hood and the first lip depending from the remaining portion of the lower edge region, whereby the second lip is positioned generally upwardly and inwardly from the first lip;
    the first and second lips at least partially overlapping, whereby the internal lip provides grease control about the entire circumference of the cover;
    the cooking chamber further comprising a burner element positioned within the firebox and below a cooking grate.

3. A cooking chamber of a barbecue grill assembly, the cooking chamber comprising:
    a discontinuous internal lip depending from an internal surface of the cover, the internal lip defining a grease control surface;
    a firebox having a rim, the rim defining a perimeter of the firebox;
    the internal cover lip being positioned inward of the firebox perimeter;
    the cover having a lower edge region that defines a lower periphery of the lid, the cover having a hood that extends from a portion of the lower edge region, the hood being disposed at a higher elevation than a remaining portion of the lower edge region whereby a passageway is formed between the hood and the rim of the firebox to provide a vent for the cooking chamber;
    the internal lip comprising at least a first lip and a second lip, the second lip depending from the hood and the first lip depending from the remaining portion of the lower edge region, whereby the second lip is positioned generally upwardly and inwardly from the first lip;
    the first and second lips at least partially overlapping, whereby the internal lip provides grease control about the entire circumference of the cover;
    the cooking chamber further comprising a support frame assembly connected to the firebox.

4. The cooking chamber of claim 3, further comprising at least one work surface pivotally connected to the support frame assembly.

5. A cooking chamber of a barbecue grill assembly, the cooking chamber comprising:
    a discontinuous internal lip depending from an internal surface of the cover, the internal lip defining a grease control surface;
    a firebox having a rim, the rim defining a perimeter of the firebox;
    the internal cover lip being positioned inward of the firebox perimeter;
    the cover having a lower edge region that defines a lower periphery of the lid, the cover having a hood that extends from a portion of the lower edge region, the hood being disposed at a higher elevation than a remaining portion of the lower edge region whereby a passageway is formed between the hood and the rim of the firebox to provide a vent for the cooking chamber;
    the internal lip comprising at least a first lip and a second lip, the second lip depending from the hood and the first lip depending from the remaining portion of the lower edge region, whereby the second lip is positioned generally upwardly and inwardly from the first lip;
    the first and second lips at least partially overlapping, whereby the internal lip provides grease control about the entire circumference of the cover;
    wherein the cover has a second hood, the hood and the second hood extending from opposing side walls of the cover, the second hood extending from a portion of the lower edge region, the second hood being disposed at approximately the same elevation as the hood whereby, when the cover is closed, a passageway is formed between the second hood and the rim of the firebox to provide a vent for the cooking chamber, the internal lip also comprising a third lip and a fourth lip, the first lip depending from a front wall of the cover, the third lip depending from a rear wall of the cover, and the fourth lip depending from the second hood, the first lip at least partially overlapping with the second and fourth lip, the third lip at least partially overlapping with the second and fourth lip, whereby the internal lip is circumferentially continuous.

* * * * *